Figure 1:
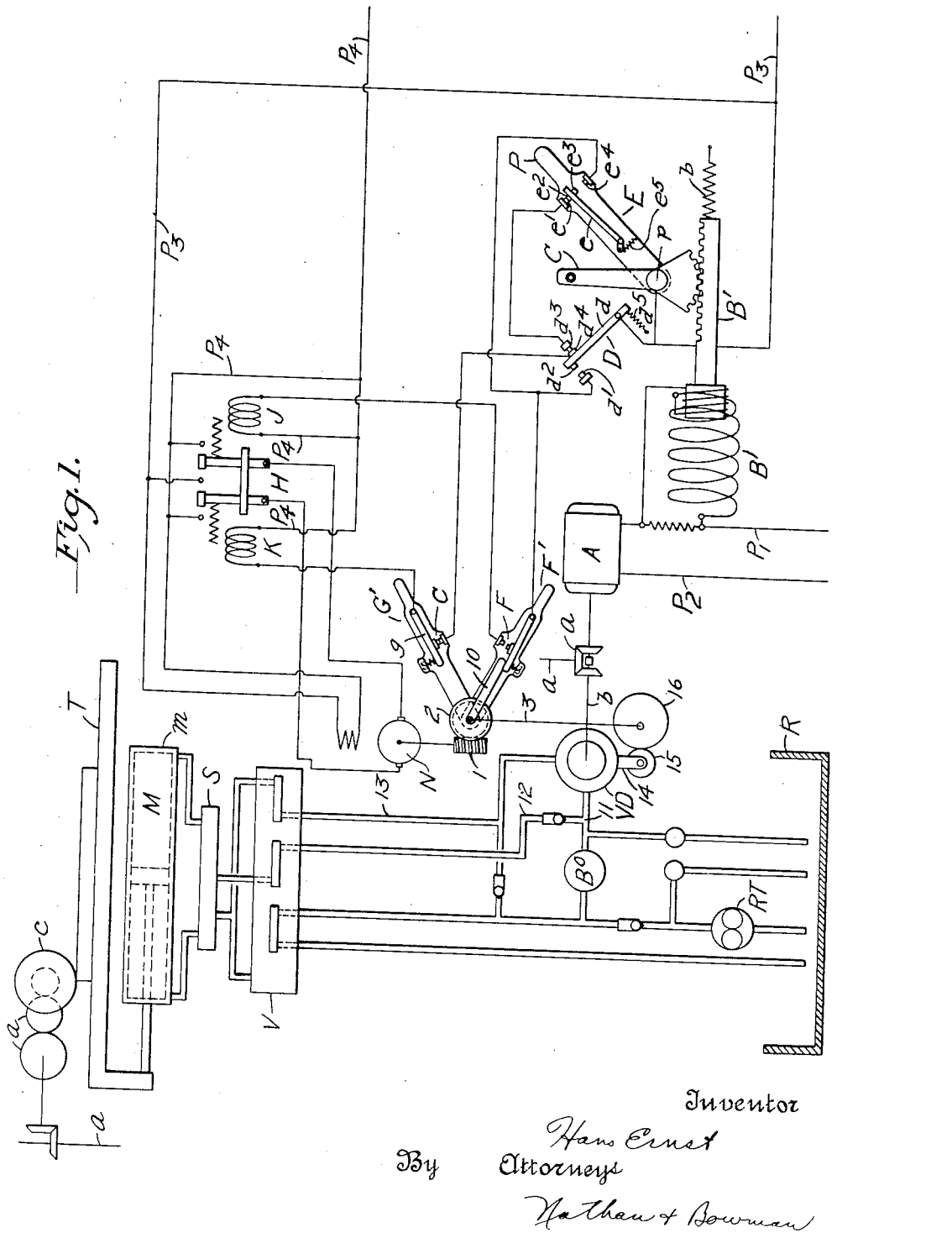

April 2, 1935.

H. ERNST 1,996,468

ELECTRICAL CONTROL FOR HYDRAULIC MOTORS

Filed Oct. 7, 1930

Inventor
Hans Ernst
By Attorneys
Nathan & Bowman

Patented Apr. 2, 1935

1,996,468

UNITED STATES PATENT OFFICE 1,996,468

ELECTRICAL CONTROL FOR HYDRAULIC MOTORS

Hans Ernst, Cincinnati, Ohio, assignor to The Cincinnati Milling Machine Company, Cincinnati, Ohio, a corporation of Ohio Application October 7, 1930, Serial No. 486,955

8 Claims. (Cl. 90—21.5)

This invention has to do with feed controls for machine tools and particularly to a type of control for regulating the rate of movement of a machine element in accordance with the work resistance.

One of the main objects of this invention is to provide a means for maintaining a constant power consumption and for varying the feed rate, within predetermined limits, in accordance with the magnitude of the tooling resistance encountered within the limits of power recommended for the operation.

It is a further object of this invention to provide a device of this character with means for regulating the maximum power available for effecting a feeding movement and regulating the feed in accordance with working requirements so that the machine will operate at a maximum rate throughout a machining operation without danger of exceeding the capacity of the tool, workpiece, or fixture.

This invention also proposes to provide a means for adjustably limiting the maximum and/or minimum rate of movement capable of being imparted to the machine element during the continuance of the tooling operation, thereby to control the extremes of movement permissive for the character of work or finish thereon desired, and as a further improvement, to suspend the action of the feed adjusting mechanism when the predetermined rate is reached even though a predetermined maximum work resistance is not reached or in the event that the controlling mechanism becomes in-operative or does not respond promptly to predetermined variations in power.

Still another object of the invention is to provide an electrically controlled means for regulating the feed to a relatively slow rate prior to engagement between tool and workpiece so that they may be brought into contact without jarring or incurring extreme stresses upon the parts, and subsequent to engagement to increase the feed until the impelling force necessary to overcome the opposing cutting forces utilizes the maximum power available for that particular operation, and as an additional refinement to decrease the feed rate at the completion of the tooling operation to a relatively low limit adaptable for tool engagement with a succeeding portion or piece, as the case may be, or for enabling the reversal of movements easily effected.

In the attainment of the results herein mentioned in accordance with this invention there is provided a feed adjusting motor operatively associated with the rate changing mechanism of the machine tool which is started, stopped or reversed to selectively start, stop or reverse the action of the rate change mechanism, by the throwing of suitable switches actuated by the armature of a load solenoid connected in series with the power lines of the main driving motor.

Since the magnetomotive force of the solenoid varies proportionately with variations in current strength or resistance it is possible to control the movement of the armature in accordance with predetermined variations in current value or resistance in the main power lines and to establish a definite relation between power value and armature movement.

The parts are so constructed and arranged that a unit increase in motor load moves the armature a unit distance and conversely, which through mechanism hereafter to be explained regulates the operation of the feed adjusting mechanism, and thereby the feed rate, in accordance with the working requirements to maintain a constant power consumption.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:—

The accompanying drawing is a diagrammatic representation of this invention as applied to an hydraulically propelled machine tool, such as, for example, a milling machine, the main elements of which have been diagrammatically illustrated in the interest of clearness.

In machines of this character it is common to regulate the feed of the table T by throttling the rate in which fluid is delivered to or discharged from the hydraulic motor M connected with the table as by means of a variable flow unit VD, of a well known construction. A small volume high pressure pump B⁰ supplements the outflow of the VD unit and functions as a makeup pump for supplying the increment lost by leakages from the system, as well as maintaining predetermined pressures therein.

It is customary, also, to provide a stop valve S for disconnecting the motor from the remainder of the system, and also a selector valve V for determining the direction of table movement for either feed or traverse rates.

For imparting a traverse movement to the table the selector valve V is shifted (manually or automatically) so as to connect the discharge port of a large volume pump RT with the motor. Under feeding conditions, units VD and B⁰ are connected with the motor M, and the rapid traverse circuit is short circuited at the valve V to the reservoir R.

During a feeding movement of the table the outflow of the units B⁰ and VD combine at 11 and flow through conduit 12 to the valve V and then to either the right or left end of the motor cylinder depending upon the position of the valves. Fluid discharged from the motor passes through the valves to line 13 and the intake side of the unit VD. It is to be noted that in the system illustrated the rate of feed of the table is controlled by the rate which fluid is permitted to be discharged from the motor but whether the system be of the discharge regulated type or of the supply regulated type, this invention is equally applicable. In the system illustrated the discharge fluid passes through line 13 to the variable delivery unit VD which is capable of adjustment in the manner hereafter to be explained.

The variable delivery unit is of standard construction and is provided with a shiftable volume control element 14, the outer end of which carries the roller 15 engageable by the periphery of a cam or eccentric 16, thus, movement of the cam, whether manually or automatically effects an adjustment of the variable delivery pump and regulates the flow therethrough to thereby regulate the rate of advance of the table T.

The drive to the spindle and cutter c comprises the usual drive train indicated generally by the letter a and receives power from the prime mover A. The hydraulic units VD, B⁰ and RT are preferably driven by the common actuator A but may be driven independently thereof if desired.

It is believed that the foregoing description will suffice for the purposes of enabling one skilled in the art to which this invention relates to understand the operation and functioning of an hydraulically propelled milling machine, however, if a more detailed description is desired, reference may be had to the British patent dated September 15, 1927, No. 297,104.

Referring to the drawing B represents a load solenoid, connected in series with the driving motor A, provided with a moving coil or plunger B'. A switch actuator C, operatively connected with the core of the solenoid, operates distributing switches D and E to thereby control the direction and duration of operation of the feed adjusting motor N.

The motor N is of the reversible type either A. C. or D. C., preferably the latter, and receives current through the lines $P_3$ and $P_4$, a reversing switch H being inserted in the armature circuit for selectively effecting reversals of the motor. This switch is electrically operated by means of the solenoids J and K, which in turn, are governed by the positions of limit switches F and G and the distributing switches D and E in the feed adjusting motor circuit.

The drawing illustrates the positions of the parts at the inception of a feed cycle, the VD unit has been adjusted to effect an approach feed rate, pole pieces $d^1$ and $d^2$ of the distributing switch D are in contact but the line switch F is open, breaking the circuit to the feed decelerating coil J which allows the reversing switch H to assume its neutral or intermediate position.

The table feeds forward at a slow rate until the work and tool are brought into engagement and thereupon placing a load upon the main driving motor A which increases the value of the power in the winding of the load solenoid B and the armature B' is caused to move inwardly against the action of the spring b. The multiple switch actuator C is accordingly moved away from distributing switch arm D which is then free to move under the action of spring $d^5$ to open the circuit to the limit switch F and coil J, and to close the contacts $d^3$ and $d^4$ which completes the electrical circuit to the limit switch G and the reversing switch coil K. Current now flows through line $P_3$, to switch E, the arm e thereof held by spring $e^5$ in a position closing pole pieces $e^1$ and $e^2$ and directing the current through $d^3$ and $d^4$ of the distributing switch D, through limit switch G and energizing solenoid coil K. The reversing switch H closes and connects the feed adjusting motor with the power lines $P_3$ and $P_4$.

The motor is thereby motivated and which, through a worm gear 1 and worm wheel 2, secured to a feed cam shaft 3, rotates a cam or eccentric 16 in a direction to effect an increase in flow through the VD unit and thereby effecting an increase in the feed rate. Movement of the cam shaft 3 in a direction increasing the rate effects a movement of a lever 10 carried thereby, away from the limit switch F which thereupon closes for a purpose later to be explained.

The feed adjusting motor N continues its operation in accelerating the feed rate until the increasing tooling resistance encountered increases the load upon the driving motor A to the extent that the increase in power requirements effects a movement of armature B' of the load solenoid to a position whereby the switch actuating lever C engages and moves the arm e of the auxiliary switch E to break the electric circuit of the feed accelerating coil K. The reversing switch H then moves to a neutral position, disconnecting the power to the feed adjusting motor N, and further increasing in feed rate is suspended.

The rate of advance continues constant, utilizing the pre-selected maximum amount of power, until there is a further variation in work resistance, such as, for example, an increase in cross-sectional area of the workpiece during the continuance of the tooling operation, or if for any reason the difficulties of metal removal increase and cause a greater consumption of power, the switch actuator C will move switch arm e further toward the right to engage contacts $e^3$ and $e^4$ and make the electric circuit of the feed decelerating coil J. The current now flows through $P_3$, terminals $e^3$ and $e^4$ of the limit switch E, switch F (which is closed) to the coil J and energizes the coil to throw the switch H to a position effecting a reversal of the feed adjusting motor N.

Cam 16 now moves in the opposite direction and permits a retraction of the volume control element of the VD unit which decreases the flow therethrough, with a resulting reduction in feed rate.

The feed decelerates, with a consequent reduction in power consumption, until the reducing power in the winding of the load solenoid allows the armature B' thereof to move outwardly, under the force of the spring b, to a position whereby the actuator C is moved in a direction away from switch arm e. Movement of the switch E immediately breaks the circuit of the decelerating coil J and the reversing switch H returns to its neutral position disconnecting the power to the feed adjusting motor N and thereby suspending further deceleration in the rate of table movement.

Should the load upon the driving motor decrease further, as by a decrease in the work resistance, actuator C moves further toward the left (as viewed in the drawing) and permits contacts $e^2$ and $e^1$ to close, thereby to complete the circuit to the solenoid coil K and throw reversing switch H to a position effecting an increase in feed rate.

In this manner the feed rate is automatically increased or decreased in accordance with the work resistance to maintain a constant power consumption in effecting movement of the table against opposing cutting forces. The machine is thereby actuated at a maximum rate during the continuance of the tooling operation without danger of overloading and without manual adjustment or attention thereto by the operator.

Certain classes of work or tools may be able to withstand a greater power input for effecting a tooling operation than will other classes of work of more fragile or springable nature and to the end that a machine tool incorporating this invention may be capable of power regulation so as to selectively control the maximum power available for a given workpiece or class of work and automatically vary the feed rate in accordance therewith it is proposed to vary the effect of given variations in power consumption upon the feed controlling mechanism.

A preferred form of power regulating means comprises an adjustable switch supporting member P, which, for convenience of operation and construction, may be pivoted at $p$ coaxial with the pivot point of the actuator C. If the positioning of the distributing switch D be fixed relative to its actuator and the position of switch E be variable, it will be seen that by effectively increasing the gap between the two, the greater will be the value of the power utilized in effecting a given tooling operation before the actuator C operates switch E to suspend or reverse the action of feed adjusting mechanism. Conversely, if the gap between the switches be reduced the lesser will be the power utilized in effecting a feed and the rate will be automatically adjusted accordingly.

However, to prevent an excessive rate of feed in the event that the power consumed does not reach the pre-selected value, or capacity of tool or work, for which the machine has been set, a high feed limit switch G is adjusted to a position whereby the movement of lever 10, carried by the rate control cam shaft 3, engages the arm $g$ and opens the switch to break the circuit of the feed accelerating coil K. The reversing switch then moves to neutral position and the feed adjusting motor comes to rest, further acceleration in feed rate is thereby automatically suspended when the maximum rate is reached.

In maintaining a constant power consumption the feed rate is automatically varied in accordance with the character of the work, during the continuance of the operation until the tool clears the workpiece. At this time there is an immediate reduction in work resistance and a corresponding variation in power value in the main power lines $P_1$ and $P_2$ leading to the main motor A as well as in the winding of the load solenoid B. The decrease in mechanical resistance decreases the electrical power and spring $b$, connected with the armature B' of the load solenoid extends the core and shifts lever C counter-clockwise. The final movement of the lever C disconnects pole pieces $d^3$ and $d^4$ and connects pole pieces $d^2$ and $d^1$ to energize coil J and reverse the operation of the feed adjusting motor N. The flow through the VD unit, and consequently the rate of feed is caused to be decreased until the low feed limit switch F is engaged and opened by lever 10. Opening of the limit switch F breaks the circuit of the feed decelerating coil J, switch H returns to neutral and the power to the reversing motor is cut off.

Further reducing of the volume of flow through the VD unit terminates and the table continues its movement but at a reduced rate or the minimum rate selected for operation of the machine during a tooling operation or at the beginning or completion thereof.

It will be noted that the limit switches F and G are each adjustably mounted and capable of independent movement as by levers F' and G' respectively thereby to vary the maximum and minimum feed rates to be utilized at any time during the feeding cycle even though the power consumed does not reach the preselected maximum or minimum, and in this respect the limit switches provide an additional means for guarding against excessive or inadequate feeds in the event that the action of the circuit breaker or the parts associated therewith, become inoperative or slow in responding to variations in the power.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A multi-speed power transmission mechanism for imparting movement to an element combining a shiftable member for controlling the speed of the transmission; power means for shifting said member; means responsive to the load on said transmission for rendering said power means effective to shift said member thereby to vary the rate of movement of the transmission and the element moved thereby; and means for governing the action of said power means comprising a mechanism operative to discontinue the action of said power member shifting means when the load on the transmission exceeds a predetermined value, and a mechanism operative to discontinue the action of said power member shifting means when the rate of movement of the transmission exceeds a predetermined value.

2. In a machine tool having a work support and a tool support and a multi-speed power transmission for imparting a feeding movement to one of said supports, the combination of means for varying the rate of feed movement imparted to said support; means responsive to a unit variation in the power required to feed said movable support against a resistance for rendering said rate varying means operative to effect a given change in the rate of movement of the movable support; and means rendering the action of said rate varying means ineffective to effect further changes in feed rate when either power requirements or rate of feed reaches a pre-selected value.

3. A feed control mechanism for a machine tool element combining, a variable speed feed transmission; a prime mover therefor connected with a source of power; means for varying the rate of feed of said transmission including an auxiliary electric motor; means responsive to a given variation in the power normally required to effect the feed movement for rendering said electric motor operative to effect a given change in the rate of movement of the feed transmission; and means to vary the effect of a given variation in power upon the action of said responsive means thereby to vary the increment of rate change effected in the feed rate.

4. A device of the character described for controlling the rate of feed movement between a work support and a tool support of a machine tool combining a variable speed transmission for imparting a movement to one of said supports at a given rate; electrically actuated means responsive to unit variations in the power required to effect a tooling operation for varying the said movement of the movable support; and manually settable means selectively limiting to any predetermined maximum value the power available to effect the tooling operation irrespective of the rate of movement resulting therefrom imparted to said movable support by said transmission.

5. A rate controlling mechanism for automatically varying the rate of speed of a power transmission combining, a variable speed transmission adapted to drive an element subjected to variations in load at various rates of speed; rate control means for said transmission; power operated means including an electric motor for actuating the said rate control means selectively to increase and decrease the rate of speed of said transmission; means responsive to load variations on the said transmission for controlling the operation and the extent of operation of said power operated rate control means, said responsive means being arranged to effect an increase in the rate of relative movement as the load on the transmission increases until a predetermined load value is reached, then selectively to increase and decrease the said rate in accordance with any variation from said predetermined load value, and to decrease the rate of relative movement between said members to a given minimum value when the load on the transmission falls to a predetermined minimum.

6. The device as set forth in claim 5 characterized by the provision of means adjustably limiting the maximum speed of the transmission to a known rate irrespective of the value of the load on the transmission.

7. A rate control device in accordance with claim 5, including manually operable means for varying the increment of speed change for a unit variation in load.

8. A feed controlling device for a machine tool having a prime mover; a variable speed feed transmission driven by the said prime mover; a rate controlling mechanism for said transmission including means for varying the rate of feed and power operated means, independent of said prime mover, adapted when rendered effective, for actuating said rate varying means to a position effecting a change in said rate of feed; means responsive to a given variation in load upon said prime mover for rendering said independent power operated means effective to actuate said rate varying means to a position effecting a given change in the said rate of feed in accordance with said variation in load; means automatically rendering said power means ineffective when said rate varying means reaches said last named position; and means adjustably limiting the maximum rate of speed of said transmission.

HANS ERNST.